(12) United States Patent
Gebele et al.

(10) Patent No.: US 7,109,496 B2
(45) Date of Patent: Sep. 19, 2006

(54) STORAGE LAYER, CONVERSION LAYER AND A DEVICE FOR READING X-RAY INFORMATION, IN ADDITION TO AN X-RAY CASSETTE

(75) Inventors: Herbert Gebele, Sauerlach (DE); Hans Schaller, Munich (DE); Robert Fasbender, Ottobrunn (DE)

(73) Assignee: Agfa-Gevaert Healthcare GmbH, Leverkusen (DE)

( * ) Notice: Subject to any disclaimer, the term of this patent is extended or adjusted under 35 U.S.C. 154(b) by 216 days.

(21) Appl. No.: 10/416,664

(22) PCT Filed: Nov. 27, 2001

(86) PCT No.: PCT/EP01/13798

§ 371 (c)(1),
(2), (4) Date: May 13, 2003

(87) PCT Pub. No.: WO02/48739

PCT Pub. Date: Jun. 20, 2002

(65) Prior Publication Data

US 2004/0041099 A1 Mar. 4, 2004

(30) Foreign Application Priority Data

Dec. 11, 2000 (DE) ................................. 100 61 576

(51) Int. Cl.
| | |
|---|---|
| *H05B 33/00* | (2006.01) |
| *G01J 1/58* | (2006.01) |
| *G01N 21/64* | (2006.01) |
| *G01N 23/04* | (2006.01) |
| *G01T 1/00* | (2006.01) |
| *A61B 6/00* | (2006.01) |
| *G21K 4/00* | (2006.01) |

(52) U.S. Cl. ............................. 250/484.4; 250/486.1; 250/487.1; 250/581; 250/582

(58) Field of Classification Search .............. 250/484.4, 250/486.1, 487.1, 483.1, 367, 368, 369, 361 R, 250/370.11, 366, 582; 976/DIG. 439
See application file for complete search history.

(56) References Cited

U.S. PATENT DOCUMENTS

| | | | |
|---|---|---|---|
| 3,891,852 A | * | 6/1975 | Bollen et al. ............... 250/391 |
| 4,752,557 A | | 6/1988 | Tsuchino et al. |
| 4,769,549 A | | 9/1988 | Tsuchino et al. |
| 4,944,026 A | | 7/1990 | Arakawa et al. |

(Continued)

FOREIGN PATENT DOCUMENTS

DE 2347923 7/1974

(Continued)

*Primary Examiner*—David Porta
*Assistant Examiner*—Frederick F. Rosenberger
(74) *Attorney, Agent, or Firm*—Milde & Hoffberg, LLP

(57) ABSTRACT

The invention relates to a storage layer (4) for storing x-ray information, comprising a large number of needle-shaped storage material areas (15A to 15L) for guiding light radiation (17 to 28, 30 to 35). An absorption zone (14A to 14N), which contains absorption material for absorbing light radiation (17 to 23, 30 to 35, 39) lies between the individual needle-shaped storage material areas (15A to 15L) and absorbs less than all of the light radiation that it receives. The invention also relates to a device for reading x-ray information from a storage layer of this type and to an x-ray cassette which has a device of this type for reading x-ray information.

11 Claims, 3 Drawing Sheets

| U.S. PATENT DOCUMENTS | | | | FOREIGN PATENT DOCUMENTS | | |
|---|---|---|---|---|---|---|
| 5,171,996 A | 12/1992 | Perez-Mendez | | DE | 195 05 729 C1 | 2/1995 |
| 5,338,926 A * | 8/1994 | Yoshida ................ 250/214 VT | | DE | 195 06 809 A1 | 8/1996 |
| 5,391,879 A * | 2/1995 | Tran et al. .................. 250/367 | | DE | 195 09 021 C2 | 9/1996 |
| 5,519,227 A * | 5/1996 | Karellas .................. 250/483.1 | | DE | 198 59 747 C1 | 12/1998 |
| 5,874,744 A | 2/1999 | Goodman et al. | | EP | 0 514 921 A1 | 11/1992 |
| 5,952,666 A * | 9/1999 | Nakano et al. .......... 250/484.4 | | EP | 0 751 200 A1 | 1/1997 |
| 6,188,501 B1 * | 2/2001 | Neushul .................... 359/196 | | JP | 59 121737 | 7/1984 |
| 6,359,285 B1 * | 3/2002 | Tasaki et al. ............ 250/484.4 | | | | |
| 6,396,066 B1 * | 5/2002 | Chen et al. ............. 250/488.1 | | * cited by examiner | | |

STORAGE LAYER, CONVERSION LAYER AND A DEVICE FOR READING X-RAY INFORMATION, IN ADDITION TO AN X-RAY CASSETTE

BACKGROUND OF THE INVENTION

The present invention relates to a storage layer for storing and a conversion layer for storing and converting x-ray information which has a multitude of needle-shape storage material areas as well as a device for reading x-ray information from a storage layer and an x-ray cassette therefor.

In particular for medical purposes, an image is generated by x-radiation of an object, for example, of a patient, where the image is stored in a storage layer as a latent image. Thus, such an x-radiation image contains x-ray information about the object. To read the x-ray information stored in the storage layer, it is excited using a radiation source. Due to this excitation, the storage layer emits light that exhibits an intensity that corresponds to the x-ray information stored in the storage layer. The light emitted by the storage layer is received by a receiving means such that the x-ray information stored in the storage layer can then be made visible. For example, the x-ray information can be displayed directly on a monitor. Typically, such storage layers are applied to a carrier material that can be either transparent or reflecting. With a reflecting carrier material, both the radiation source and the receiving means are arranged on the same side of the carrier material, that is, on that side of the carrier material where the storage layer is located. If the storage material is located on a transparent carrier material, then the radiation source is located on one side of the carrier material, and the receiving means on the opposite side of the carrier material. This arrangement has the particular advantage that a larger amount of the radiation emitted by the storage layer can be captured by the receiving means. A better reproduction quality of the x-ray information stored in the storage layer is, therefore, possible.

For example, from the patent document DE 198 59 747 C1 it is known to use a special storage layer for storing x-ray information, where the storage layer exhibits a special crystallite, needle-shaped structure. The special storage layer exhibits numerous "needles" that can serve the purpose of guiding both the excitation and the emission radiation. Crystalline "needles" are cultivated for such storage layers. Such a needle storage layer is constructed of binary alkali halides, such as cesium bromides, CsBr. These structured alkali halides can be doped with suitable activators such as gallium, thallium, europium, etc. Depending on their given purpose, the individual needle crystals vary in height between 100 and 600 μm and have a thickness of about 10 μm. Typically, the individual needles are separated from one another by a small air gap. Both the excitation and the emission lights are guided in the individual needles that serve as light conductors according to the principle of total reflection. Incident excitation radiation that arrives at a certain angle is largely transmitted without scattering until it strikes an information center in the crystal lattice of the needle, where the x-ray information is stored. The emission radiation that is generated through the excitation of the information center is transferred in the respective needle and is guided out of this needle such that it can be detected by the receiving means. Such a needle-shaped storage layer is known, in particular, from the European patent application EP 0 751 200 A1. Using this special storage layer reduces scattering of the excitation radiation within the storage layer. In particular, when reading the x-ray information that is stored in the storage layer line by line, scattering of the excitation radiation perpendicular to the direction of the lines is disadvantageous because information centers may be excited that belong to a line of the storage layer other than the one that is being read at the moment. In this manner, emission radiation may get "lost"; i.e., it cannot be detected by the receiving means. In addition, scattering of the emission radiation within the storage layer is reduced with the result that in particular a good local resolution is achieved for the detection of the emission radiation in the receiving means. However, it has been found that, for example, excitation radiation that enters the storage layer at an incident angle that is greater than a certain angle does not remain in the respective needles but instead passes perpendicular through these needles. Especially because these needles exhibit an irregular outer structure, scattering of the excitation radiation can occur that is disadvantageous for the quality of the reproduction of the x-ray information. Since, in particular, the irregular outer structure of the needles results in a portion of the excitation radiation not being fully reflected in the needle, a blurring is created in the reproduction of the x-ray information. A similar situation applies to the emission radiation that is essentially emitted isotropically by an information center that is struck by the excitation radiation. Due to the aperture angle that is determined by the relation between the refractive index of air to the alkali halide of which the individual needles have been cultivated, a portion of the emission light is not fully reflected in the needle but instead is emitted from the respective needle. This leads to a corresponding degradation of the local resolution when detecting the emission radiation.

Alternatively to the interim storing of x-ray information in the storage layer, as described above, x-ray information that is contained in the x-radiation can also be converted directly into light radiation using a conversion layer. This light radiation that contains an image of the x-ray information can then be detected by a light-sensitive sensor and converted into electrical signals. Such a conversion layer and a device where such a coating is used are known, for example, from the patent documents DE 195 05 729 C1, DE 195 06 809 A1 or DE 195 09 021 C2. The conversion layer for converting the x-radiation into light radiation is designated as a so-called scintillator layer that may consist essentially of cesium iodide CsI. X-ray detectors that contain such conversion layers are already available on the market today. For example, the company Trixell, 460 Rue de Pommarin, 38430 Moirans, France, uses such a conversion layer in their product Pixium 4600. These conversion layers for converting x-radiation into light radiation contain numerous conversion zones with materials that directly convert x-radiation into light radiation. Similar to the storage layers described above, these conversion zones are arranged in the conversion layers in needle-shape next to one another. This means that the conversion of x-radiation to light radiation occurs in the individual needles. The light energy, which has a low energy in comparison to the x-radiation, can exit a needle where it was generated due to the aperture angle at the barrier layers of the needles and can arrive at one or more other needles. This has the result that light radiation that has been generated in a certain needle exits that conversion layer at an entirely different location, and is therefore detected by the light-sensitive sensor at a location that does not correspond to the location of the needle where the light radiation was generated. As was the case previously with the storage layers, the local resolution is falsified during the detection of the light radiation that is emitted by the conversion layer due to the described scattering.

SUMMARY OF THE INVENTION

It is, therefore, the objective of the present invention to specify a storage layer and a conversion layer, as well as a device for reading x-ray information, and an x-ray cassette therefor, such that a good quality is possible when reproducing x-ray information.

At the storage layer according to the invention, an absorption layer for absorbing light radiation is located between the individual needle-shaped storage material areas. Correspondingly, an absorption material for absorbing light radiation is located between the needle-shaped conversion material areas of the conversion material zones according to the invention.

Based on the present invention, light rays, i.e., excitation and/or emission radiation which exit on the sides of the needles due to the aperture angle as determined by the used materials, are absorbed. As a result, the overall amount of light radiation that enters from one needle into one or more adjacent needles is reduced. Thus, the scattering of the light radiation can be kept low such that the sharpness of the x-ray image that is reproduced from the stored or converted x-ray information is improved. Here, aperture angle refers to that angle up to which a total reflection of the excitation or emission radiation occurs in the storage layer. After creating the needle-shaped storage or conversion layer, an absorption material can be filled between the cultivated needles. Undesired absorption material that may be present on the surface of the storage or conversion layer after it has been poured in the spaces between the needles can be removed by subsequent polishing or grinding of the surface. Such removal of the absorption material can also be carried out using chemical methods. To this end, the surface of the storage or conversion layer is advantageously pretreated such that the adhesion of the absorption material is very weak. With the storage layer, the stimulation radiation for exciting the information centers of the storage layer can enter unhindered into the storage layer due to the removal of the absorption material from the surface. Furthermore, the emission radiation can exit undampened from the storage layer. This is particularly advantageous for the storage layer because it has a lower-energy stimulation radiation than the x-radiation that strikes the conversion layer directly and is converted into light radiation.

In an advantageous embodiment of the invention, two absorption zones are present between two adjacent needle-shaped storage material areas with an air layer between the two the absorption layers. Thus, the air layer separates the two absorption zones from one another. If an absorption zone with an absorption material borders a storage material area, then the aperture angle is reduced in comparison to the case, where air borders the storage material areas. This means that a smaller amount of excitation and emission radiation is fully reflected within the needle-shaped storage material areas. A larger amount of excitation and emission radiation exits the storage material areas. This radiation exiting the storage material areas is, at least partially, absorbed in the absorption zone. However, it cannot be fully avoided that radiation also penetrates the absorption zones and that it is not totally absorbed in these areas. By having advantageously an air layer introduced between two absorption zones, an additional portion of the light exiting the needle-shaped storage material area is again reflected at the barrier layer—due to the large aperture angle at this transition. This reflected light is then again, at least partially, absorbed in the absorption zone that it has been reflected back to. In this manner, the amount of scatter radiation that exits a storage material and enters one or more adjacent storage material areas is reduced even further. This advantageous design of the absorption zones can be applied correspondingly to the conversion layers.

In one particularly advantageous embodiment of the invention, the light radiation, i.e., the stimulation and/or emission radiation, entering the absorption zone by means of the absorption material, is not fully absorbed but only to an amount that is smaller than the respective full stimulation and/or emission radiation entering the absorption zone. This advantageously ensures that the amount of emission radiation exiting the storage layer is greater than with a full absorption of the light radiation.

In an additional advantageous embodiment, the absorption material contains pigments. Such pigments are in an ideal manner well suited to absorb the excitation radiation and the emission radiation, which typically have wavelength in the visible range of the spectrum. To absorb the excitation radiation, which is typically in the red wavelength range of the spectrum, blue pigments are particularly well suited. To absorb emission radiation that is typically in the blue wavelength range of the spectrum, red pigments are particularly well suited. This advantageous design of the absorption zones is correspondingly applicable for the conversion layer as well.

In an additional advantageous embodiment of the invention, the pigments are dissolved in a solvent. Since the storage material areas contain alkali halides, which are typically water-soluble inorganic crystals, preferably an organic solvent should be used.

Due to the high water solubility of the crystals of the storage material areas, it is also recommended to dry the pigments and thus to eliminate a potential water portion.

This advantageous embodiment of the absorption zone is correspondingly applicable for the conversion layer as well.

For a full understanding of the present invention, reference should now be made to the following detailed description of the preferred embodiments of the invention as illustrated in the accompanying drawings.

DESCRIPTION OF THE PREFERRED EMBODIMENT

Figure 1:
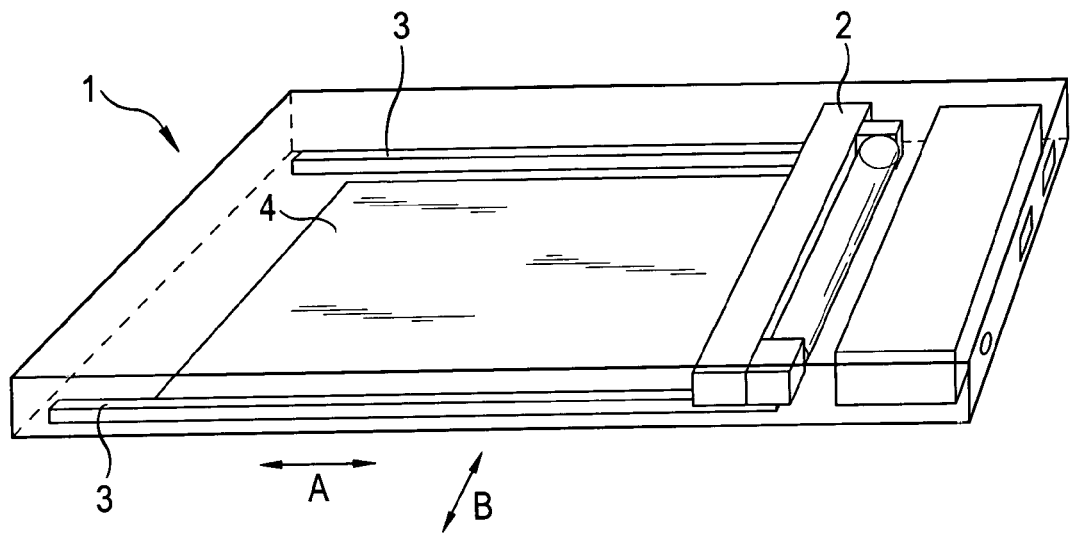
FIG. 1 shows an exemplary application of a device according to the invention for reading x-ray information from a storage layer according to the invention.

The preferred embodiment of the present invention will now be described with reference to FIGS. 1–5 of the drawings. Identical elements in the two figures are designated with the same reference numerals.

FIG. 1 shows an exemplary embodiment of a device 1 according to the invention for reading x-ray information from a storage layer. In the present exemplary embodiment, this device is an x-ray cassette 1. The x-ray cassette 1 contains a storage layer 4 as well as a reader head 2 for reading x-ray information that is stored in the storage layer 4. For this purpose, the reader head 2 includes a radiation source (not shown) for exciting the storage layer and a receiving means (not shown) for receiving the emission radiation emitted by the storage layer 4 due to the excitation. Here, the radiation source is designed as a line light source and contains numerous laser diodes arranged next to one another. With these laser diodes, a line of the storage layer 4 can be excited. Such a line stretches along a direction B essentially across the entire width of the storage layer 4. In place of the line light source equipped with laser diodes, a different light source that is suitable for exciting the storage layer 4 can be used as well. For example, a so-called "flying spot" radiation source may be used where a laser beam emitted by a laser device is directed to a pivoted polygon mirror. The polygon mirror rotates such that the laser beam is guided across a line of the storage layer 4, whereby one individual point of the line is excited at a time. The receiving means contained in the reader head 2 may contain a so-called "charge-coupled-device" (CCD) cell that is used for receiving the emission radiation emitted by the storage layer 4. The CCD cell includes numerous photo detectors arranged in a line parallel to one another. With these photo detectors, a photoelectric conversion of the received emission radiation can be performed. A fixed connection is established between the line light source and the CCD cell such that the image of the x-ray information stored in the storage layer 4, i.e., the excitation of the storage layer and the reception of the radiation emitted due to the excitation are precisely harmonized with one another such that a precise assignment is ensured even during the actual reading procedure. The entire reader head 2 for reading the information stored in the storage layer 4 can be moved via a drive means (not shown), which may be a linear motor, in a movement direction A. This can generate an advance in order to read the entire storage layer 4 using the line-by-line excitation and detection. To guide the reader head 2 for reading the storage layer 4, the x-ray cassette 1 includes two guide bars 3 along the two longitudinal sides of the storage layer 4. The storage layer 4 is a storage layer that exhibits a crystallite, needle-shaped structure. Absorption zones that contain an absorption material for absorbing light radiation are present between the individual needles of the storage layer 4.

Figure 2:
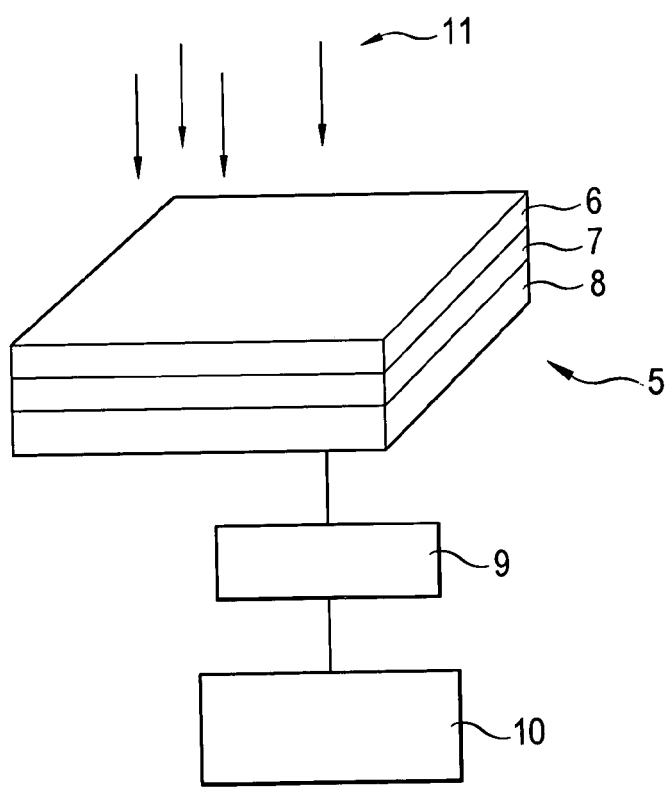
FIG. 2 is a schematic presentation of an exemplary application of an arrangement with a conversion layer according to the invention.

FIG. 2 shows an example of an arrangement that includes a conversion layer 6 for converting x-radiation into light radiation. The conversion layer 6 is a so-called scintillator layer. This scintillator layer is part of a conversion means 5 that additionally includes an optical imaging means 7 and an opto-electronic image converter. The scintillator layer 6, the optical imaging means 7 and the image converter 8 are designed in a plane and are arranged directly behind one another in the converter means 5. The scintillator layer 6 contains numerous crystalline needle-shaped converter material areas, where the x-radiation entering these areas is converted to light radiation. The converter material areas of the scintillator layer 6 may consist, for example, of cesium iodide, CsI, which in turn can be doped. In its needle-shaped structure, the scintillator layer corresponds to a large extent to the structure of the storage layer 4 (FIG. 1). Absorption zones with absorption material for absorbing light radiation that is generated due to the x-radiation are present between the individual needle-shaped converter material areas of the scintillator layer 6. The optical imaging means 7 can contain, for example, an array with numerous micro-lenses. This micro-lens array reproduces the light radiation emitted by the scintillator layer 6 on the image converter 8. The image converter 8 contains numerous light-sensitive sensors that convert the reproduced light radiation to corresponding electrical signals. The image converter 8 may consist of hydrogenous, amorphous silicon (aSi:H). An x-radiation 11 emitted by an x-ray cannon strikes the scintillator layer 6. The x-radiation with the x-ray information is converted to light radiation corresponding to the x-ray information in this scintillator layer 6. The image converter 8 generates electrical signals corresponding to the information contained in the light radiation. The image converter 8 is connected to a control means 9 that is provided with the electrical signals from the image converter. The control means 9 performs image processing such that the x-ray information can subsequently be presented on a monitor 10 that is connected to the control means 9. A reading of stored x-ray information as is required using the x-ray cassette according to FIG. 1. is not necessary when using the conversion means 5 according to FIG. 2. Instead, the x-radiation 11 can be converted directly in order to present the x-ray information contained in it on a monitor 10.

Figure 3:
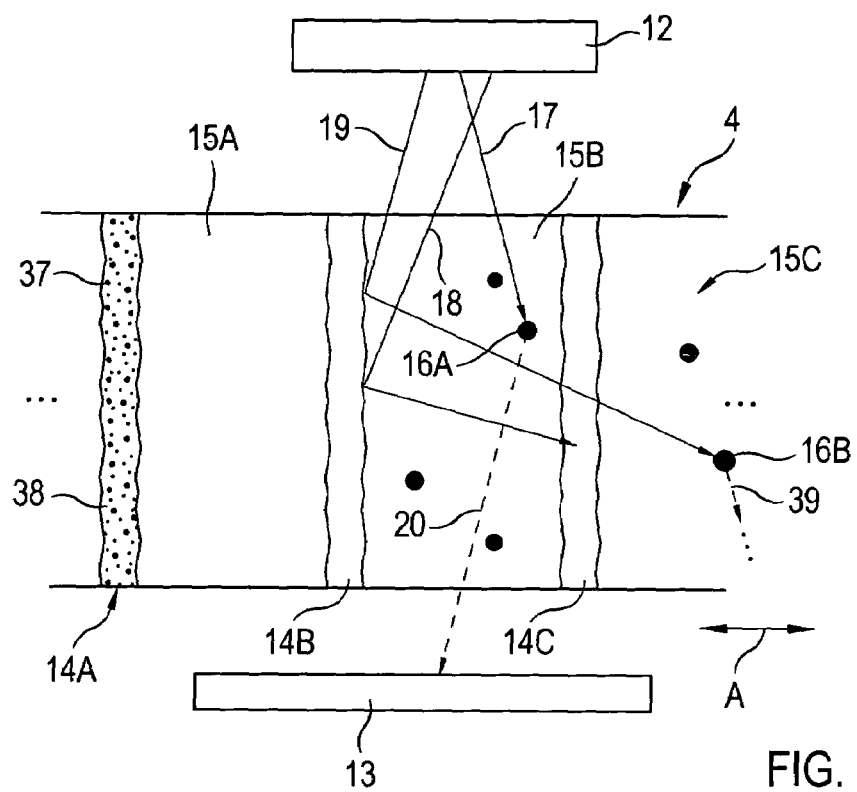
FIG. 3 shows a first preferred embodiment of a storage layer according to the invention with an exemplary course of excitation beams.

FIG. 3 shows a presentation of a reader head with a radiation source 12 and a receiving means 13 along the advance direction A of the reader head. The storage layer 4 is located between the radiation source 12 and the receiving means 13. FIG. 3 shows schematically a section through the storage layer 4 along the advance direction A of the reader head with the radiation source 12 and the receiving means 13. The storage layer 4 contains numerous needle-shaped storage areas arranged next to one another. FIG. 3 shows a first needle-shaped storage area 15A with a second needle-shaped storage area 15B arranged adjacent to it, and in turn, a third needle-shaped storage area 15C arranged next to the second storage area. Absorption zones that contain an absorption material for absorbing light radiation are present between the respective needle-shaped storage areas 15A to 15C. A first absorption zone 14A is located at the left side of the first storage area 15A. The absorption material is indicated in this first absorption zone 14A representative for the remaining absorption zones—also of the subsequent preferred embodiments. The absorption material contains a solvent 38 that contains numerous pigments 37. Advantageously, these pigments are of such a color that either the excitation radiation emitted by the radiation source 12 or the emission radiation emitted by the respective needle-shaped storage areas due to the excitation with the excitation radiation can be absorbed. To this end, the pigments 37 are preferably of a red or of a blue color. The blue color can be used in particular to absorb the excitation radiation emitted by the radiation source 12. The red color particles 37 can in particular absorb the emission radiation. Other absorption materials can be used in place of the color particles 37 and the solvent 38; in particular, the color particles 37 can also exhibit other colors than red and blue, as long as these colors are suited for absorbing excitation radiation and/or emission radiation. A one hundred percent absorption of excitation and emission radiation, as could be achieved, for example, using black pigments in the absorption material, is here not desired, because too large a quantity of excitation and emission radiation would be absorbed, which would lead to too small a portion of the emission radiation being able to exit the storage layer 4. Certain blurriness when detecting the emission radiation exiting the storage layer 4 is, therefore, accepted in order to keep the intensity of the emission radiation that exits the storage layer 4 at a certain level. Advantageously, the absorption material can be designed such that only a certain amount of the intensity of the excitation or emission radiation is absorbed in the respective absorption zones.

At least a portion of the respective excitation or emission radiation is, therefore, fully absorbed only after passing through several absorption zones. In this manner, it is possible to set optimal absorption properties of the absorption material with regard to the intensity of the emission radiation exiting from the storage layer 4 while accepting a certain blurriness.

A second absorption zone 14B is present between the first needle-shaped storage area 15A and the second storage area 15B. A third absorption zone 14C is present in the storage layer 4 between the second storage area 15B and the third storage area 15C.

Numerous information centers are present in the storage areas 15A to 15C due to the irradiation with x-radiation. The entirety of the information centers and in particular their local positions in the storage layer 4 corresponds to the stored x-ray information. Serving as examples, some information centers are indicated in FIG. 3 by dark circles. A representative information center with the reference character 16A is designated in the second storage area 15B, and an additional representative information center with the reference character 16B is designated in the third storage area 15C.

A first excitation beam 17, a second excitation beam 18 and a third excitation beam 19 are shown in FIG. 3 representative for numerous excitation radiations that are emitted by the radiation source 12. The first excitation beam 17 enters the second storage area 15B and there strikes the information center 16A. Due to the excitation of the information center 16A by the first excitation beam 17, the storage area 15B emits an emission beam 20. This emission beam 20 is shown here representative of numerous emission beams that are largely emitted isotropically from the information center 16A. As presented in FIG. 3, the emission beam 20 exits the second storage area 15B and strikes the receiving means 13. The second excitation beam 18 also enters the second storage area 15B and there strikes the barrier layer to the second absorption zone 14B. This striking of the barrier layer occurs under a certain angle that is smaller than the aperture angle, which is determined by the refractive indices of the storage area material and the absorption material. A total reflection occurs at the barrier layer such that the second stimulation beam is reflected back into the second storage area 15B. Since the second excitation beam 18 reflected in this manner does not strike an information center in the second storage area 15B, it strikes the barrier layer to the third absorption zone 14C. Since the angle under which the second excitation beam strikes this barrier layer to the third absorption zone 14C is greater than the aperture angle, total reflection does not occur. Thus, the second excitation beam 18 enters the third absorption zone 14C and is there absorbed by the pigments contained in it, such that it cannot exit the third absorption zone 14C to enter the third storage area 15C. The third excitation beam 19 also enters the second storage area 15B and there strikes the barrier layer to the second absorption layer 14B under a certain angle. This angle under which the third excitation beam 19 strikes the barrier layer is smaller than the aperture angle, such that the third excitation beam 19 is reflected into the second storage area 15B. Since the third excitation beam on its path through the second storage area 15B also does not strike an information center, it arrives at the barrier layer to the third absorption zone 14C. The third excitation beam 19 strikes this barrier layer at an angle that is greater than the aperture angle. Thus, a total reflection does not occur at the barrier layer, and the third excitation beam enters the third absorption zone 14C. The third excitation beam 19 is not absorbed in the third absorption zone 14C. In fact, the third excitation beam 19 passes through the third absorption zone 14C and enters the third storage area 15C. In the third storage area 15C, the third excitation beam 19 finally strikes the information center 16B. The excitation of the information center 16B by the third excitation beam 19 results in additional emission beams, being emitted, essentially isotropically, by this information center 16B. As a representative example, an emission beam 39 that emits from the information center 16B is shown in FIG. 3. The direction of propagation of this emission beam 39 indicates that it will exit the third storage area 15C without being able to be detected by the receiving means 13. Thus, at least a portion of the information contained in the information center 16B cannot be detected by the detection means 13. Thus, an information loss occurs due to the scattering of the third excitation beam 19 into the third storage area 15C. Thus, FIG. 3 shows, in particular through the courses of the second and third excitation beams 18 and 19, how the advantageous absorption effect of the absorption zones between the individual needle-shaped storage areas has a positive effect on reading the x-ray information. The absorption zones prevent that at least a portion of the excitation radiation passes over into adjacent storage areas, where they then strike information centers present in the adjacent storage areas, which then emit emission radiation due to the excitation radiation, where a location-accurate emission radiation cannot be detected by the receiving means 13.

Figure 4:
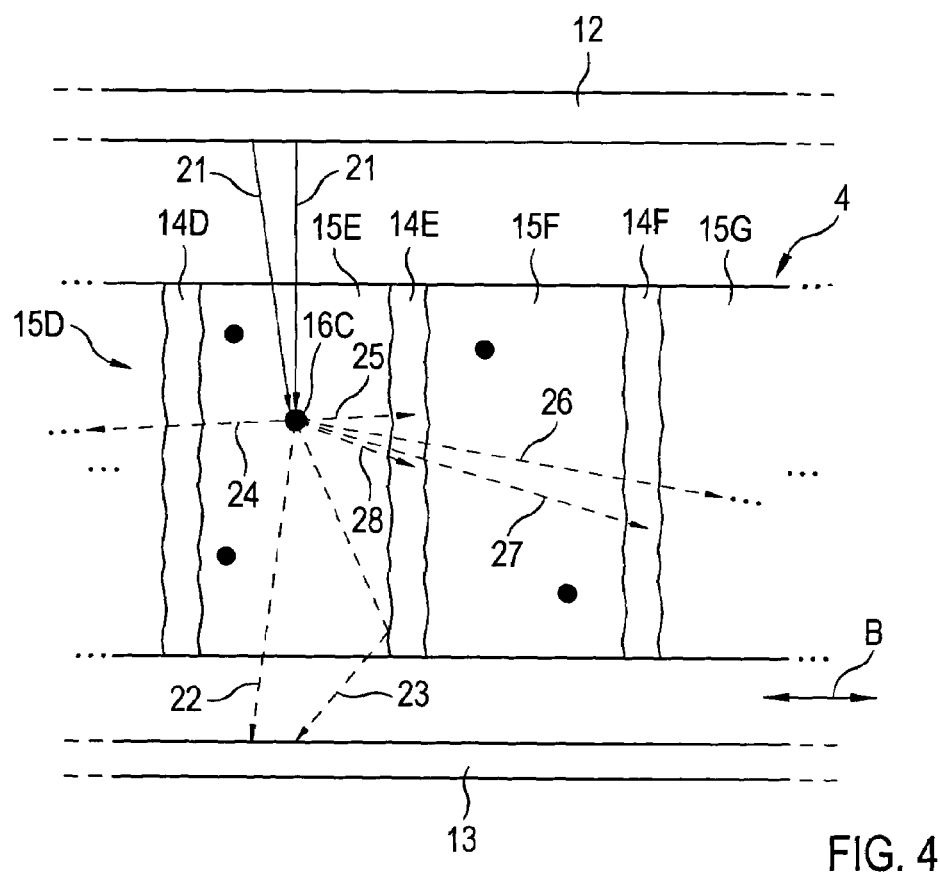
FIG. 4 shows a second preferred embodiment of the storage layer according to the invention with an exemplary presentation of the course of emission beams.

FIG. 4 shows a second exemplary embodiment of the reader head and the storage layer according to FIG. 3. Here, the reader head with the radiation source 12 and the receiving means 13 as well as the storage layer 4 are shown in a direction of propagation B of a line of the storage layer 4 that is excited by the radiation source 12. FIG. 4 shows schematically a section through the storage layer 4 along the direction B. The storage layer 4 presented in FIG. 4 exhibits a fourth needle-shaped storage area 15D and arranged adjacent to it, a fifth needle-shaped storage area 15E. A fourth absorption zone 14D is located between the fourth storage area 15D and the fifth storage area 15E.

To the right of the fifth needle-shaped storage area 15E is a sixth needle-shaped storage area 15F. Located between the fifth and the sixth storage areas 15E and 15F is a fifth absorption zone 14E. To the right of the storage area 15F is a seventh needle-shaped storage area 15G of the storage layer 4. Located between the sixth storage area 15F and the seventh storage area 15G is a sixth absorption zone 14F. In the fifth storage area 15E and the sixth storage area 15F, blackened circles again indicate information centers that contain x-ray information. As a representative example, one of these information centers in the fifth storage area 15E is designated with the reference character 16C.

During operation, the radiation source 12 emits numerous excitation beams in the direction of the storage layer 4. As representative examples for these numerous excitation beams, two excitation beams 21 are presented in the exemplary embodiment according to FIG. 4. Here, these two excitation beams 21 enter the fifth storage area 15E and both strike the information center 16C. Numerous emission beams are, essentially isotropically, emitted from the information center 16C due to the excitation of the information center 16C by the two excitation beams 21. Representative for the multitude of emission beams are shown a second emission beam 22, a third emission beam 23, a fourth emission beam 24, a fifth emission beam 25, a sixth emission beam 26, a seventh emission beam 27 and an eight emission beam 28. In the following, the courses of the emission beams 22 to 28 shall clarify the mode of action of the absorption zones 14D to 14F.

The second emission beam 22 runs directly from the information center 16C through the fifth storage area 15E in the direction of the receiving means 13. The emission beam 22 is detected by the receiving means 13. The third emission beam 23 runs—beginning at the information center 16C—also through the fifth storage area 15E in the direction of the receiving means 13. The third emission beam 23, however, strikes the barrier layer of the fifth storage area 15E and the fifth absorption zone 14E prior to exiting the storage layer 4. The angle under which the third emission beam 23 strikes this barrier layer is smaller than the aperture angle, which is determined by the refractive indices of the materials of the fifth storage area 15E and the fifth absorption zone 14E. Thus, a reflection of the third emission beam 23 occurs at the barrier layer. The reflected third emission beam 23 initially remains in the fifth storage area 15E and subsequently exits the storage area and therefore the storage layer 4, and is then captured by the receiving means 13. The fourth emission beam 24 runs—beginning at the information center 16C—also initially through the fifth storage area 15E, and then strikes the barrier area of the fifth storage area 15E to the fourth absorption zone 14D. Since the angle with which the fourth emission beam 24 strikes this barrier layer to the fourth absorption zone 14D is greater than the aperture angle, a reflection of the fourth emission beam 24 does not occur at the barrier layer. In fact, the fourth emission beam 24 enters the fourth absorption zone 14D. However, the fourth emission beam 24 is not absorbed in the fourth absorption zone 14D. The emission beam 24 passes through the absorption zone 14D and enters the fourth storage area 15D. A location-accurate detection of the x-ray information that is transported by the fourth emission beam 24 is, therefore, not possible with the receiving means 13. A different situation occurs with the fifth emission beam 25. It runs—beginning at the information center 16C—initially also through the fifth storage area 15E, and then strikes the barrier layer between the fifth storage area 15E and the fifth absorption zone 14E. Because the angle, under which the emission beam 25 strikes this barrier layer, is also greater than the aperture angle, no reflection of the emission beam 25 occurs at the barrier layer. In fact, the emission beam enters the fifth absorption zone 14E. Contrary to the fourth emission beam 24, the fifth emission beam 25 is, however, absorbed in the fifth absorption zone 14E. It does not enter from the fifth absorption zone 14E into the adjacent sixth storage area 15F. A location-inaccurate detection of the emission beam 25 by the receiving means 13 is, therefore, not possible. The same takes place with the eighth emission beam 28. It too enters—beginning at the information center 16C—the fifth absorption zone 14E and is then absorbed by it. The eighth emission beam 28 does not enter into the sixth storage area 15F. Thus, the absorbed eighth emission beam 28 also does not contribute to the location blurriness.

Also the sixth emission beam 26—beginning at the information center 16C—strikes the barrier layer between the fifth storage area 15E and the fifth absorption zone 14E. Here, the angle under which the sixth emission beam 26 strikes the barrier layer is greater than the aperture angle. Thus, the sixth emission beam is not reflected at the barrier layer to the fifth absorption zone 14E. In fact, the sixth emission beam 26 enters into the fifth absorption zone 14E, passes through it and then arrives at the sixth storage area 15F. Thus, the emission beam 26 has not been absorbed in the fifth absorption zone 14E. The emission beam 26 passes through the sixth storage area 15F and arrives at the barrier layer between the sixth storage area 15F and the sixth absorption zone 14F. Here too, the angle under which the emission beam 26 strikes this barrier layer is greater than the aperture angle, such that again no reflection occurs. Rather, the emission beam 26 enters the sixth absorption zone 14F, passes through it and arrives at the seventh storage area 15G. Thus, the sixth emission beam 26 is not absorbed in the sixth absorption zone 14F. It is again different with the seventh emission beam 27. Similar to the sixth emission beam 26, it too—beginning at the information center 16C—passes through the fifth absorption zone 14E and the sixth storage area 15F. Thereafter, it too strikes the barrier layer between the sixth storage area 15F and the sixth absorption zone 14F. Because the angle under which the emission beam 27 strikes this barrier layer is again greater than the aperture angle, no reflection occurs at the barrier layer. The emission beam 27 enters into the sixth absorption zone 14F, where it is absorbed, contrary to the emission beam 26. The emission beam 27 does then not continue through the absorption zone 14F into the seventh storage area 15G. One can recognize that the sixth absorption zone 14F contributes to the avoidance of additional location blurriness due to a continued distribution of the seventh emission beam 27.

Figure 5:
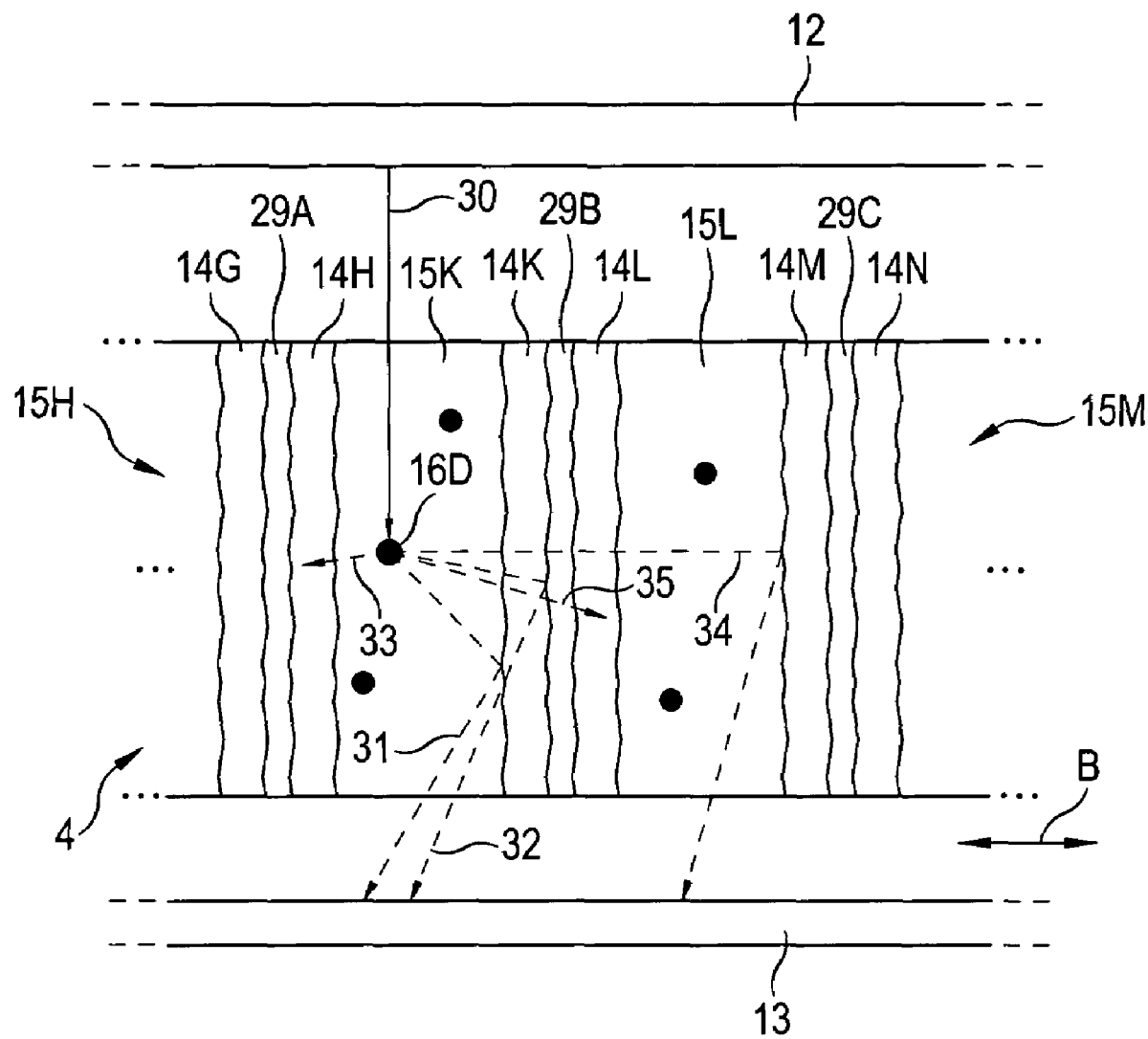
FIG. 5 shows a third preferred embodiment of a storage layer according to the invention, where the absorption zones exhibit an air layer between the needles.

FIG. 5 shows a third preferred embodiment of the storage layer 4 that contains x-ray information. In this example, the x-ray information is also read using a reader head, which includes the radiation source 12 and the receiving means 13. FIG. 5 shows the presentation of the radiation source 12, the receiving means 13 and the storage layer 4, which is arranged between these two, in the direction of propagation B of a line of the storage layer 4, which is excited using the radiation source 12. FIG. 5 schematically shows a section through the storage layer 4 along the direction B.

The section of the storage layer 4 presented in FIG. 5 shows an eighth needle-shaped storage area 15H, a ninth needle-shaped storage area 15K, a tenth needle-shaped storage area 15L and an eleventh needle-shaped storage area 15M. Absorption zones that contain absorption material for absorbing the light radiation are present between these four storage areas 15H to 15M. Contrary to the embodiments of FIGS. 3 and 4, here, air gaps are introduced into these absorption zones. Thus, a seventh absorption zone 14G and an eighth absorption zone 14H are present between the eighth storage area 15H and the ninth storage area 15K. These two absorption zones 14G and 14H in turn are separated from one another by an air gap 29A. The air gap 29A contains an air layer. Corresponding to this arrangement is the situation between the ninth storage area 15K and the tenth storage area 15L. A ninth absorption zone 14K and a tenth absorption zone 14L are present between these two storage areas 15K and 15L. These two absorption zones 14K and 14L in turn are separated from one another by an air gap 29B containing an air layer. An eleventh absorption zone 14M and a twelfth absorption zone 14N are present between the tenth storage area 15L and the eleventh storage area 15M. These two absorption zones 14M and 14N are separated from one another by an air gap 29C containing an air layer.

To clarify the mode of operation of the air layers 29A to 29C, which are present between the individual absorption zones, the beam profiles of excitation and emission beams are described anew based on FIG. 5 in the following. During operation, the radiation source 12 emits a multitude of excitation beams in the direction of the storage layer 4. The excitation beam 30 is shown in FIG. 5 as a representative example for the multitude of excitation beams. This excitation beam 30 enters the ninth storage area 15K and there strikes an information center 16D. Due to the excitation of the information center 16D by the excitation beam 30, a multitude of emission beams are essentially isotropically emitted. FIG. 5 shows as representative examples of the multitude of emission beams a ninth emission beam 31, a tenth emission beam 32, an eleventh emission beam 33, a twelfth emission beam 34 and a thirteenth emission beam 35. The information center 16D emits the ninth emission beam 31 in the direction of the receiving means 13. However, the emission beam 31 strikes the barrier layer between the ninth storage area 15K and the ninth absorption zone 14K. The angle under which the emission beam 31 strikes this barrier layer is smaller than the aperture angle such that a reflection occurs at the barrier layer.

The reflected ninth emission beam 31 then continues through the ninth storage area 15K, exits it and is then captured by the receiving means 13. The aperture angle at the barrier layer between the ninth storage area 15K and the ninth absorption zone 14K is, in turn, determined by the refractive indices of the storage area material and the absorption zone material.

The tenth emission beam 32 also runs—beginning at the information center 16D—in the direction of the barrier layer toward the ninth absorption zone 14K. However, since the angle under which the emission beam 32 strikes this barrier layer is greater than the aperture angle, no reflection occurs; in fact, the tenth emission beam 32 enters the ninth absorption zone 14K and, since it is not absorbed in the absorption zone 14K, strikes the barrier layer between the ninth absorption zone 14K and the air layer 29B. The tenth emission beam 32 is reflected at this barrier layer, because the angle under which the emission beam 32 strikes this barrier layer to the air layer 29B is smaller than the aperture angle. This aperture angle is determined by the refractive indices of the absorption material and air. The aperture angle between the absorption material and air, called the air aperture angle, is greater than the aperture angle between the absorption material and the storage area material, called the material aperture angle. It is, therefore, possible that light beams strike a barrier layer at an angle that is greater than the material aperture angle, such that reflections do not occur, however that is smaller than the air aperture angle such that a reflection does occur at a barrier layer toward the air. Thus, by applying the air layers 29A to 29C between the individual absorption zones 14G to 14N, the light beams are absorbed in the absorption zones 14G to 14N. At the same time, due to the air layers 29A to 29C, the aperture angle at the air layers 29A to 29C is enlarged versus the barrier layers between the storage area material and the absorption material. This is especially made clear by the profile of the tenth emission beam 32. Although this tenth emission beam 32 enters into the absorption zone 14K, it is reflected at the barrier layer to the air layer 29B. This is the case because the aperture angle at the barrier layer between the absorption zone 14K and the air layer 29B is greater than the aperture angle at the barrier layer between the storage area 15K and the absorption zone 14K.

Furthermore, FIG. 5 shows the eleventh emission beam 33, which emits from the information center 16D and enters into the absorption zone 14H. The eleventh emission beam 33 is absorbed in this absorption zone 14H, i.e., it is avoided that the emission beam 33 enters into another storage material area. Contrary to this, the twelfth emission beam 34—beginning at the information center 16D—enters the ninth absorption zone 14K. The emission beam 34 passes through the absorption zone 14K as well as the air layer 29B and the tenth absorption zone 14L, because the angle under which the beam 34 strikes each barrier layer is greater than the respective aperture angle. Thus, the emission beam 12 enters into the tenth storage area 15L, passes through it until it strikes the barrier layer to the eleventh absorption layer 14M. The beam is reflected at this barrier layer and passes through the tenth storage area 15L in the direction of the receiving means 13. Finally, the beam 34 exits the storage layer 4 and is captured by the receiving means 13. The thirteenth emission beam 35—beginning at the information center 16D—passes through the ninth storage area 15K, the ninth absorption zone 14K and the air layer 29B and enters the tenth absorption zone 14L. The thirteenth emission beam 35 is absorbed in this tenth absorption zone 14L. Thus, it is avoided that the thirteenth emission beam 35 further propagates and that this emission bean exits the storage layer 4 and is detected by the receiving means 13 at a location that is not in close proximity to the original information center 16D.

There has thus been shown and described a novel storage layer and conversion layer, as well as a device for reading x-ray information and an x-ray cassette therefor which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A storage layer for storing x-ray information comprising (a) a multitude of needle-shaped storage material areas for guiding excitation light radiation and for producing emission light radiation in response thereto, and (b) two absorption zones, with absorption material for absorbing light radiation, disposed between the individual needle-shaped storage material areas with an air layer present between these two absorption zones, said absorption material absorbing less than the total amount of the excitation radiation that enters said absorption zones.

2. A storage layer as set forth in claim 1, wherein the absorption zones are directly adjacent to needle-shaped storage material areas.

3. A storage layer as set forth in claim 1, wherein the absorption material contains pigments.

4. A storage layer as set forth in claim 3, wherein the pigments that are contained in the absorption material are dissolved in a solvent.

5. A storage layer as set forth in claim 3, wherein the pigments contain primarily blue pigments.

6. A storage layer as set forth in claim 3, wherein the pigments contain primarily red pigments.

7. A device for reading x-ray information from a storage layer according to claim 1, said device comprising a radiation source for exciting the storage layer using excitation radiation and receiving means for receiving emission radiation that is emitted from the storage layer due to the excitation with the excitation radiation.

8. An x-ray cassette comprising a reading device as set forth in claim 7.

9. A device as set forth in claim 1, wherein the absorption material is selected such that the excitation radiation is partially absorbed.

10. A storage layer as set forth in claim 1, wherein said absorption material also absorbs less than the total amount of emission light radiation that enters said absorption zones.

11. A device as set forth in claim 10, wherein the absorption material is selected such that the emission radiation is partially absorbed.

* * * * *